United States Patent [19]

Doroszkowski

[11] Patent Number: 4,464,241
[45] Date of Patent: Aug. 7, 1984

[54] ELECTROPHORETIC COATING PROCESS

[75] Inventor: Andrew Doroszkowski, Slough, England

[73] Assignee: Imperial Chemical Industries PLC, London, England

[21] Appl. No.: 320,570

[22] Filed: Nov. 12, 1981

[30] Foreign Application Priority Data

Nov. 19, 1980 [GB] United Kingdom ................. 8037109

[51] Int. Cl.$^3$ ...................... C25D 13/06; C25D 13/10
[52] U.S. Cl. ................................................. 204/181 C
[58] Field of Search ..................... 204/181 C

[56] References Cited

U.S. PATENT DOCUMENTS 3,455,806  7/1969  Spoor et al. .................... 204/181 C
4,231,850 11/1980  Kato ................................ 204/181 C
4,246,087  1/1981  Tsou et al. ..................... 204/181 C
4,294,741 10/1981  Bosso .............................. 204/181 C

FOREIGN PATENT DOCUMENTS 48-56235  8/1973  Japan ............................. 204/181 C Primary Examiner—Howard S. Williams
Attorney, Agent, or Firm—Cushman, Darby & Cushman

[57] ABSTRACT

A process of coating with film-forming material an article which is made a cathode in an electrical circuit and is immersed in either an aqueous dispersion of a derivative of the film-forming material comprising a stabilizing cationic group hydrolyzable at the cathode or an aqueous dispersion of the film-forming material stabilized by association with a distinct surfactant comprising a cationic group hydrolyzable at the cathode, to yield the film-forming material as a coating on the cathode when electric current is passed between the cathode and a counter-electrode.

Also suitable coating compositions in which the film-forming material is primarily stabilized by ionic groups hydrolyzable at the cathode.

7 Claims, No Drawings

ELECTROPHORETIC COATING PROCESS

This invention relates to a process of coating an electrically conductive substrate with a film-forming material and to coating compositions useful in the process.

It is known to coat an electrically conductive substrate with a film-forming material by a process wherein (a) a stable dispersion of the material is prepared in an aqueous medium which is stabilised by ionised hydrophilic groups contained in or associated with the film-forming material; and then (b), by the passage of electric current between electrodes immersed in the dispersion, the film-forming material is de-stabilised in the region of and is deposited on the substrate which has been made a cathode. The stability of the film-forming material dispersed in the aqueous medium may be due primarily to the ionisation, in the presence of an acid, of hydrophilic groups such as amino groups contained in the material or to an association between the material and a suitable distinct cationic surfactant containing ionisable hydrophilic groups. In such cases the film-forming material is deposited on the cathodic substrate, due to the loss of the stabilising ionic charges under the conditions prevailing at the substrate, in a chemical form which is substantially the same as that of the initial dispersible material before it is dispersed in the aqueous medium. When stabilisation is by association between the film-forming material and a distinct ionic surfactant the film-forming material is deposited on the cathodic substrate under the conditions prevailing at that substrate and the chemical composition of the ionic surfactant is substantially unaffected by the passage of electric current. Hence it could be a disadvantage of the prior processes that the ionisable hydrophilic groups used to stabilise the film-forming material in the aqueous medium remain present in or associated with the deposited material, and that the material may then remain sensitive to water.

We have now found that certain film-forming materials may be deposited on an electrically conductive cathodic substrate from a stable aqueous dispersion of an ionisable derivative of these materials, or from a stable aqueous dispersion of these materials when associated with a distinct ionisable surfactant, when the derivative or the surfactant comprise a hydrophilic ionised group which is primarily responsible for the stability of the dispersion and which group is decomposed by hydrolysis at the cathode. In general the product of hydrolysis will be less sensitive to water than the original hydrophilic group.

Thus, according to this invention we provide a process of coating an electrically conductive cathodic substrate with a film-forming material wherein the substrate is immersed as a cathode in a stable aqueous dispersion of (i) a derivative of the film-forming material which comprises a hydrophilic cationic group or groups primarily responsible for the stability of the dispersion and hydrolysable at the cathode the film-forming material being destabilised and caused to deposit at the cathode under the conditions prevailing at the cathode when an electrical current is passed.

or of (ii) the film-forming material stabilised by association with a distinct surfactant, which surfactant comprises a hydrophilic cationic group or groups primarily responsible for the stability of the dispersion and hydrolysable as the cathode, the film-forming material being destabilised and caused to deposit at the cathode under the conditions prevailing at the cathode when an electric current is passed.

an electric current is passed through an electrical circuit between the substrate cathode and a counter-electrode in the dispersion for a sufficient period of time to yield a coating of the film-forming material on the substrate.

In referring to cationic groups which are primarily responsible for the stability of the dispersion we mean that in their absence the dispersion will be clearly unstable, as evidenced by the dispersion losing its identity (e.g. as a result of settlement) after, say, 4 hours.

Preferably the cationic group which is hydrolysable at the cathode comprises a quaternary ammonium group, and more preferably the quaternary ammonium group is in the vicinity of a hydrolysable ester linkage. Particularly suitable quaternary ammonium-containing cationic groups are those which comprise the carboxylic acid residue of an ester group. Especially suitable groups are those obtained, for example, by quaternising with a tertiary amine a

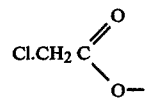

residue. Such a residue may be attached to a wide variety of film-forming polymers for example an addition polymer, or an epoxy resin.

Thus a preferred cationic group comprises a residue of structure

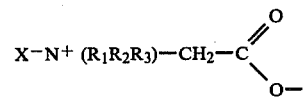

wherein $R_1$, $R_2$, $R_3$ may be the same or different and may be a $C_{1-20}$ alkyl or substituted alkyl group; an aryl or substituted aryl group; an aralkyl or substituted aralkyl group; a heterocyclic group; or any one or more of $R_1$, $R_2$, $R_3$ may form part of a heterocyclic group; and X is a monovalent counterion. When the quaternising tertiary amine is trimethylamine the hydrolysable cationic group is

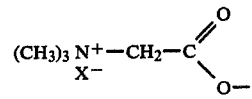

A wide variety of quaternising amines may be employed, including N-methylmorpholine. X may be for example a halogen.

Similarly the quaternary ammonium groups just described may be present in a cationic surfactant of structure

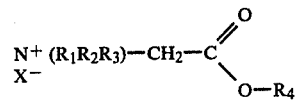

wherein $R_4$ is an oleophilic group. Suitable oleophilic groups include $C_8$ or higher alkyl or substituted alkyl groups.

Suitable film-forming materials in the invention include addition polymers prepared by the polymerisation or copolymerisation of one or more ethylenically unsaturated monomers; epoxy and epoxy ester resins; alkyd resins; polyurethane resins; epoxidised polybutadiene resins; and polyester resins. The cationic hydrophilic hydrolysable groups may be introduced into these classes of resin by conventional chemical methods. Crosslinking agents may also be employed for example P/F, M/F, & U/F resins, and polyisocyanates.

Preferably there is present in the film-forming material at least 2% by weight of cationic groups based on the weight of the film-forming material when such groups are primarily responsible for its stability. There may be used up to 50% by weight based on the film-forming material of a distinct surfactant as stabiliser for the dispersion.

The cathodic substrate to be coated may be comprised of a metal, for example iron, steel, aluminium, copper, zinc and alloys, or of carbon, or may be made conductive for example by the incorporation of metal or carbon particles.

This invention also provides a coating composition suitable for application by electrodeposition to a cathodic substrate by the process herein described which comprises a stable aqueous dispersion of a film-forming material stabilised primarily by ionised hydrophilic cationic groups present in the material which are hydrolysable at a cathode or stabilised primarily by a distinct surfactant comprising ionised hydrophilic cationic groups which are hydrolysable at a cathode. Preferably the cationic groups are quaternary ammonium groups. The composition of this invention may comprise pigment, filler and any other conventional component of coating compositions.

The invention further provides coated articles which have been coated by the present process.

The invention is illustrated by the following Examples in which parts and percentages are by weight:

EXAMPLE 1

This Example illustrates the preparation and electrodeposition of a stable aqueous dispersion of a film-forming addition polymer containing quaternary ammonium groups which are hydrolysable at a cathode.

An addition copolymer was prepared from methyl methacrylate (275.6 parts) and glycidyl methacrylate (54.5 parts), (i.e. in the weight ratio 85/15) in toluene (549 parts) by heating for 2 hours at 75° C. with azodiisobutyronitrile (2.2 parts). A further 1 part of azodiisobutyronitrile was added after 2 hours and heating continued for a further 2 hours. To the product (of 40% by weight solids content) was added dry chloroacetic acid (35.9 parts) and 0.10% based on copolymer of an N,N-dimethyl N-alkylamine and the temperature raised to 120° C. until all of the acid had reacted with the glycidyl group of the polymer. The chlorine thus introduced into the polymer was quaternised with a sufficient quantity of trimethylamine by heating at 80° C. for 3 hours.

The final quaternised addition polymer was isolated at 50% solids content and emulsified in distilled water so that approximately 30% by weight of the total weight of the emulsion was of the quaternised addition polymer in the disperse phase.

When metal electrodes were immersed as anode and cathode respectively in the emulsion and an electrical current passed at 100 volts for a short period, a continuous coating was deposited on metal cathodes which were of aluminium, steel or copper.

EXAMPLE 2

This Example illustrates the preparation and electrodeposition of a stable aqueous dispersion of an epoxy ester resin containing quaternary ammonium groups hydrolysable at a cathode and confirms that hydrolysis takes place at the cathode.

An epoxy ester was prepared by heating a commercially available epoxy resin ("Epikote" 815; —'-'Epikote" is a Registered Trade Mark of Shell Chemical Company) having an epoxy equivalent of 175–195 (475 parts) chloracetic acid (94 parts), a dimer fatty acid (commercially available as "Empol" 1024; "Empol" is a Registered Trade Mark), (300 parts) and toluene (375 parts) at 150° C. for 5½ hours when the acid value of the product was approximately zero. The product (626 parts) was mixed with trimethylamine (30 parts) and toluene (188 parts) and heated at 80° C. for 5 hours to quaternise the chlorine contained in the epoxy ester. The final resin solution (100 parts) was mixed with distilled water (188 parts) and a stable emulsion was produced using a Silverson homogeniser.

When steel electrodes were immersed as anode and cathode in the emulsion and an electric current passed at 100 volts over 2 minutes, a smooth coherent coating film was obtained at the steel cathode.

A comparison was made between the infra-red spectra of (a) the resin, as prepared in the Example, before electrodeposition, (b) the resin which was electrodeposited at the cathode, and (c) the resin of (a) which had been treated with 10% aqueous sodium hydroxide at an elevated temperature for 1 hour.

The ratio of the peak values in the spectra due to the presence of the carboxyl groups and the aromatic ring respectively were (a) 1.13; (b) 0.76; and (c) 0.61.

This confirms that a substantial proportion of those quaternary ammonium groups present in the initial resin which are hydrolysable under alkaline conditions, (i.e. with the loss of a carbonyl group) are lost on deposition at the cathode.

EXAMPLE 3

A quaternised addition polymer prepared as in Example 1 was used to disperse carbon black at 20% by weight solids in a mixture of methyl ethyl ketone and butyl cellosolve to give a pigment millbase. To this millbase was added further addition polymer (and 4% by weight of a commercially available plasticiser) to give a final black paint which contained 40% by volume of carbon black based on the volume of resin. The paint was heated to 70° C. and hot distilled water slowly added to it until there was obtained a dispersion of paint in water, there being approximately 20% (based on the total) disperse phase in an aqueous continuous phase.

The resin was electrodeposited at a cathode at 100 volts and a black continuous coating was obtained on stoving.

EXAMPLE 4

This Example illustrates the use according to the invention of an emulsion stabilised by a cathodic surfactant hydrolysable at a cathode.

Soya bean oil (50 parts) was emulsified in deionised water (150 parts) in the presence of a commercially-available hydrolysable surfactant trimethyl alkylamino acetate chloride. A coating was obtained on a phosphated steel panel as cathode when electric current was passed in an electrical circuit at 150 volts.

EXAMPLE 5

This Example illustrates the use of an alternative hydrolysable group in the resin used in Example 2.

The trimethylamine of Example 2 was replaced by the molar equivalent of N-methyl morpholine to produce a self-emulsifiable polymer which was emulsified to produce a stable emulsion in deionised water. A satisfactory coating was obtained on a steel cathode.

EXAMPLE 6

The resin of Example 2 was mixed with a phenol/formaldehyde crosslinking agent in the proportion 6:1 respectively (solids content) and deposited at a cathodic article. The article was stoved at 180° C. for ½ hour to yield a coating having good corrosion-resistance properties.

We claim:

1. A process of coating an electrically conductive cathodic substrate with a film-forming material wherein the substrate is immersed as a cathode in a stable aqueous dispersion of
   (i) a derivative of the film-forming material which comprises a hydrophilic cationic group primarily responsible for the stability of the dispersion and hydrolysable at the cathode the film-forming material being destabilised and caused to deposit at the cathode under the conditions prevailing at the cathode when an electrical current is passed,
   or of (ii) the film-forming material stabilised by association with a distinct surfactant, which surfactant comprises a hydrophilic cationic group primarily responsible for the stability of the dispersion and hydrolysable at the cathode the film-forming material being destabilised and caused to deposit at the cathode under the conditions prevailing at the cathode when an electrical current is passed,
and an electric current is passed through an electrical circuit between the substrate cathode and a counter-electrode in the dispersion for a sufficient period of time to yield a coating of the film-forming material on the substrate.

2. A process according to claim 1, wherein the cationic group comprises a quaternary ammonium group.

3. A process according to claim 2 wherein the quaternary ammonium group is in the vicinity of a hydrolysable ester linkage.

4. A process according to claim 3, wherein the cationic group comprises a quaternary ammonium-containing carboxylic acid residue of an ester group.

5. A process according to claim 1 wherein the cationic group comprises a residue of structure

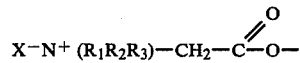

wherein $R_1$, $R_2$, $R_3$ may be the same or different, and may be a $C_{1-20}$ alkyl or substituted alkyl group; aryl or substituted aryl group, an aralkyl or substituted aralkyl group; a heterocyclic group; or one or more of $R_1$, $R_2$ and $R_3$ may form part of a heterocyclic group; and X is a monovalent counter-ion.

6. A process according to claim 1, wherein the surfactant of (ii) has a structure

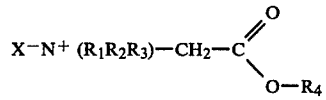

wherein $R_4$ is an oleophilic group and $R_1$, $R_2$, $R_3$ may be the same or different, and may be a $C_{1-20}$ alkyl or substituted alkyl group; aryl or substituted aryl group; an aralkyl or substituted aralkyl group; a heterocyclic group; or one or more of $R_1$, $R_2$ and $R_3$ may form part of a heterocyclic group; and X is a monovalent counter-ion.

7. An article which has been coated by the process of claim 1.

* * * * *